United States Patent
Bergmann

[11] Patent Number: 5,822,118
[45] Date of Patent: Oct. 13, 1998

[54] WALK-OFF DEVICE

[75] Inventor: Ernest Eisenhardt Bergmann, Borough of Fountain Hill, Lehigh County, Pa.

[73] Assignee: Lucent Technologies Inc., Murray Hill, N.J.

[21] Appl. No.: 578,274

[22] Filed: Dec. 26, 1995

[51] Int. Cl.$^6$ .................................................. G02B 5/30
[52] U.S. Cl. .......................................... 359/495; 359/496
[58] Field of Search ...................... 359/494, 495, 359/496, 500, 639, 640, 465; 385/11, 36, 122

[56] References Cited

U.S. PATENT DOCUMENTS 5,212,586  5/1993  Van Delden ............................ 359/496
5,631,774  5/1997  Yoshizawa ............................... 359/639

FOREIGN PATENT DOCUMENTS 2-168204  6/1990  Japan ..................................... 359/496

*Primary Examiner*—Paul M. Dzierzynski
*Assistant Examiner*—Darren E. Schuberg

[57] ABSTRACT

A walk-off device comprising a birefringent or uniaxial material achieves increased spatial separation of the ordinary and extraordinary beams by using at least one face of the device for reflection. The two beams are folded and path length increased within the device; the folding increases the spatial separation of the beams when they exit from the device as compared to a device in which the beams are not folded. The reflection face is oriented either parallel or perpendicular to the optic axis of the material.

3 Claims, 1 Drawing Sheet

WALK-OFF DEVICE

TECHNICAL FIELD

This invention relates generally to the field of optical apparatus that includes a walk-off devices and particularly to such devices that use reflection and refraction.

BACKGROUND OF THE INVENTION

The successful design of optical apparatus frequently depends upon selection of materials having appropriate physical characteristics such as refractive index. Birefringent materials; that is, materials in which different polarizations have different refractive indices, have been known for a long time and have been used in optical apparatus. An important class of birefringent materials is formed by uniaxial materials; that is, materials with a single optic axis. As is well known, there is no birefringence for light rays parallel to the optic axis. In fact, such birefringent materials exist in nature with calcite probably being the best known. Many people have observed the double image that results when a piece of calcite is placed over an object. This is understood by considering a parallelepiped solid formed of a uniaxial birefringent material and a light beam perpendicularly incident on one surface of the material. One polarization forms the ordinary ray which is refracted in a manner that is independent of the orientation of the optic axis at the surfaces; this ray passes directly through the solid as if the solid were isotropic. The other polarization forms the extraordinary ray which is refracted in a manner dependent upon the relative orientation of the optic axis at the surfaces and the incident ray direction; the extraordinary ray emerges from the solid parallel to the ordinary ray but spatially displaced from it. Thus, there are two images. The two rays are commonly referred to as the O and E rays, respectively.

Although the double image observed when calcite is placed over an object is probably most used as a laboratory demonstration in elementary science courses, birefringence is now widely used in certain types of optical devices. Because one beam moves away spatially from the other beam, the devices are commonly referred to as walk-off devices. The spatial separation of the beams increases linearly as the beams pass through the birefringent material. The subsequent, independent separate processing of the beams is most easily performed if the spatial separation of the beams is large. However, large separation of the beams requires a long piece of birefringent material.

It is noted that the term walk-off is not used to describe beam splitters; these devices only use reflection to obtain spatial separation and spatial redirection of beams. Birefringent based devices are typically effective over a broader band of wavelengths than are beam splitters and produce better polarization discrimination than do beam splitters. Conversely, walk-off devices can be used to overlay parallel beams of orthogonal polarizations into a single beam of both polarizations. Accordingly, a need exists for a walk-off device that reduces the size of the birefringent material required for a given spatial separation of the beams.

SUMMARY OF THE INVENTION

According to an exemplary embodiment of this invention, optical apparatus includes a walk-off device made from a birefringent material having at least a first face where the beams are refracted and at least a first intermediate face where the beams are reflected. The beams are the ordinary and extraordinary beams. The intermediate face is either parallel or perpendicular to the optic axis of the birefringent material. In a preferred embodiment, the faces where refraction and reflection occurs are perpendicular to a common plane containing the optic axis. In yet another preferred embodiment, there are two refraction faces.

DETAILED DESCRIPTION

Figure 1:
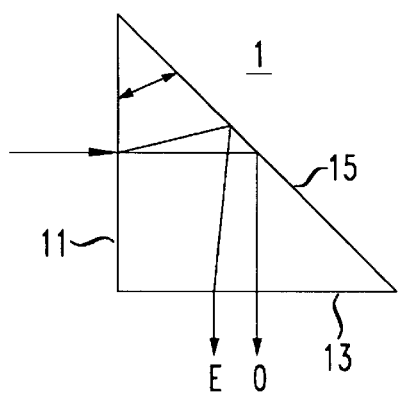
FIGS. 1–4 are sectional views of embodiments of walk-off devices according to this invention.
Figure 2:
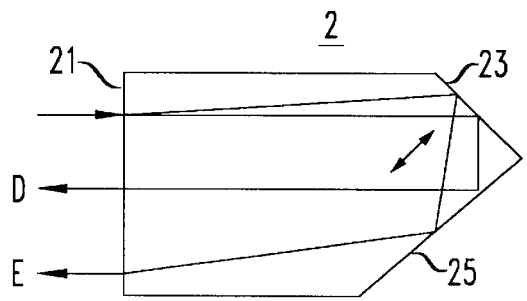

The invention will be first described by reference to the exemplary embodiment depicted in FIG. 1. Depicted in FIG. 1 is a walk-off device, indicated as 1, having first and second refraction faces 11 and 13, respectively, and a reflection face 15. The three faces are perpendicular to a common plane which is the plane of the paper in the embodiment illustrated. The device is formed from a birefringent that is, uniaxial, material, such as calcite or rutile, that has an optic axis in the plane of the drawing with its direction indicated by the double headed arrow. It is understood that the device may be a component of a larger optical apparatus. Birefringent materials are well known to those skilled in the art, and such persons will be able to fabricate devices according to this invention after consideration of the following description of the operation of this embodiment. Operation of the device is readily understood. The incident beam enters the device at refraction face 11 and is separated into the ordinary and extraordinary beams O and E. Note that for the normal incidence depicted, the direction of the O beam does not change at the first refraction face 11. These beams diverge and are incident on the reflection face 15. This face is typically either parallel or perpendicular to the optic axis; the perpendicular orientation is depicted for reasons of exposition only. Due to the relative orientation of the beams and the optic axis, the beams are reflected from reflection face 15 and directed toward the second refraction face 13 where the extraordinary beam is again refracted. The usual law of reflection, that is, the angle of incidence equals the angle of reflection, is true for the ordinary ray. The law is also true for the extraordinary rays as well when the orientation of the reflecting surface is parallel or perpendicular to the optic axis. If the reflecting surface is neither parallel nor perpendicular to the optic axis, not only is the extraordinary ray reflected in a different manner, but there may be cross coupling between the ordinary and extraordinary cases resulting in more beams after reflection. See Bergmann, The Bell System Technical Journal, 61, pp. 935–948, July–August 1982 for a discussion of this case. The two beams are mutually parallel after emerging from the device. Consideration of operation of the device shows that the path length of the beams is increased by the reflection face 15; thus, greater spatial separation of the beams has been achieved within a smaller device. That is, the "folding" of the beams by reflection achieves greater separation of the beams for a given size of device due to the greater path length within the device. The device depicted in FIG. 1 has first and second refraction faces 11 and 13 and a reflection face 15. FIG. 2 depicts a device, indicated as 2, with a first refraction face 21 and first and second reflection faces 23 and 25. The paths of the O and E beams through the device are shown. In this embodiment, the beams both enter and exit from the device at refraction face 21.

The devices depicted in FIGS. 1 and 2 are especially useful because they not only increase the spatial separation of the beams by increasing the path length through the material, they also change the direction of the beams. The embodiments depicted in FIGS. 1 and 2 change the beam direction approximately 90 and 180 degrees, respectively. The change in beam direction may result in a further decrease in device size as compared to devices that lack beam folding.

Figure 3:
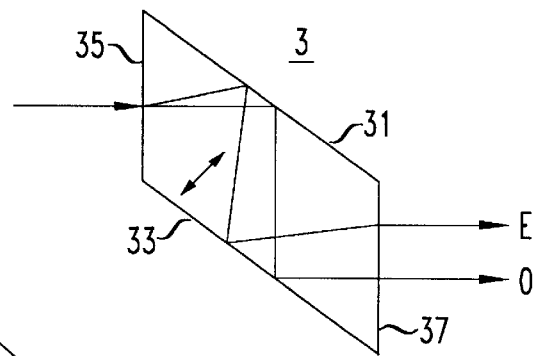

FIG. 3 depicts a device of yet another embodiment. This device, indicated as 3, has first and second reflection faces 31 and 33, and first and second refraction faces 35 and 37. Again, the arrows indicate the direction of the beams through the device.

Figure 4:
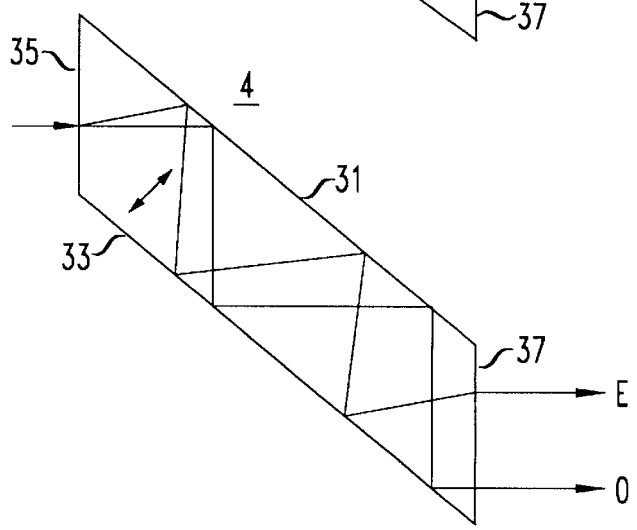

FIG. 4 depicts yet another embodiment of this invention. The geometry of this device is generally similar to that depicted in FIG. 3; however, reflection surfaces 31 and 33 are longer than they were in FIG. 3. In addition to showing that a device may have two reflection and two refraction faces as was also true of the embodiment depicted in FIG. 3, this embodiment also illustrates that the beams may be incident on a given reflection face more than a single time. The embodiment does not require that the O and E beams be reflected the same number of times. In contrast to the embodiments of FIGS. 1 and 2, the initial and final beams in the devices depicted in both FIGS. 3 and 4 propagate in the same direction although they are spatially displaced from each other.

It will be readily appreciated, as previously mentioned, that the walk-off devices according to this invention may be used as a component in other optical apparatus such as, for example, in a circulator or in an isolator.

Variations in the embodiments described will be readily thought of by those skilled in the art. For example, the optic axis may be parallel to the refraction face in the device depicted in FIG. 1. Additionally, although the optic axis in the device depicted in, for example, FIG. 3, is in the plane of the paper, it need not be in the plane of the paper. Furthermore, although the beam is shown as being perpendicularly incident on the first refraction face and emergent perpendicular to the second refraction face, other angles may be used. Additionally, the refraction and reflection faces need not be perpendicular to a common plane.

The invention claimed is:

1. Optical apparatus having a walk-off device comprising: birefringent material having an optic axis and at least a first refraction face, and at least a first intermediate reflection face substantially not parallel to said refraction face and having an orientation to said optic axis, wherein the orientation is parallel or perpendicular thereto, said birefringent material further comprising at least a second reflection face.

2. Optical apparatus as recited in claim 1 in which said second reflection face has an orientation to said optic axis, wherein the orientation is parallel or perpendicular thereto.

3. Optical apparatus as recited in claim 2 in which said reflection and refraction faces are perpendicular to a common plane.

\* \* \* \* \*